United States Patent
Aoike

(10) Patent No.: US 7,123,284 B2
(45) Date of Patent: Oct. 17, 2006

(54) CELLULAR PHONE SET HAVING SELF-TIMER PHOTOGRAPHING FUNCTION WITH COUNTDOWN INDICATION

(75) Inventor: Toru Aoike, Saitama (JP)

(73) Assignee: NEC Corporation, Tokyo (JP)

( * ) Notice: Subject to any disclaimer, the term of this patent is extended or adjusted under 35 U.S.C. 154(b) by 70 days.

(21) Appl. No.: 10/795,387

(22) Filed: Mar. 9, 2004

(65) Prior Publication Data

US 2004/0179091 A1 Sep. 16, 2004

(30) Foreign Application Priority Data

Mar. 14, 2003 (JP) .............................. 2003-070878

(51) Int. Cl.
*H04N 7/14* (2006.01)
(52) U.S. Cl. ............................... 348/14.02; 348/14.01; 348/207.99; 455/550.1
(58) Field of Classification Search .. 348/14.01–14.09, 348/231.99, 333.05, 207.99; 455/550.1, 455/556.1
See application file for complete search history.

(56) References Cited

U.S. PATENT DOCUMENTS

2002/0142810 A1 10/2002 Kawasaki et al.

FOREIGN PATENT DOCUMENTS

| JP | 401292972 A | * | 11/1989 |
| JP | 02-241179 | | 9/1990 |
| JP | 6-51387 | | 2/1994 |
| JP | 07-333710 | * | 12/1995 |
| JP | 7-333710 | | 12/1995 |
| JP | 11-069214 | | 3/1999 |
| JP | 2002048968 A | * | 2/2002 |
| JP | 2002-204386 | * | 7/2002 |
| JP | 2002-295445 | | 10/2002 |
| JP | 2002-300237 | | 10/2002 |

* cited by examiner

*Primary Examiner*—Melur Ramakrishnaiah
(74) *Attorney, Agent, or Firm*—Young & Thompson

(57) ABSTRACT

A cellular phone set that permits a person to be photographed to recognize a photographing timing easily is disclosed. The cellular phone set of the present invention comprises countdown indication section having a function to display information which notifies a photographing timing in self-timer photographing on a sub-display section mounted on a rear surface of a phone body. The function to display information which notifies a photographing timing can be realized by using a numeral that indicates remaining seconds until photographing on the sub-display section, by stepwise altering a display color of the sub-display section by using different colors as time for photographing draws nearer, or by permitting a user to appropriately combine these approaches.

9 Claims, 5 Drawing Sheets

4b-1　　　　4b-2　　　　4b-3

CELLULAR PHONE SET HAVING SELF-TIMER PHOTOGRAPHING FUNCTION WITH COUNTDOWN INDICATION

BACKGROUND OF THE INVENTION

1. Field of the Invention

This invention relates to a cellular phone set having a self-timer photographing function and, more specifically, to a cellular phone set that permits a person to be photographed to recognize a photographing timing easily.

2. Description of the Related Art

In recent years, a camera-attached cellular phone set provided with a photographing function has been used widely. In this camera-attached cellular phone set, generally, a lens for photographing is provided on a rear surface of a body of the cellular phone set, so that a photographer, when photographing a person, directs the rear surface of the body of the cellular phone set toward the subject to be photographed and presses a shutter (keyboard) at an appropriate timing as observing the subject on a main display section provided on its front surface, thereby photographing the subject.

Conventionally, in self-timer photographing by use of this camera-attached cellular phone set, a person to be photographed is permitted to recognize a photographing timing by gradually speeding up blinking of an accessory LED of the cellular phone set or emitting sound. However, a change in blinking speed of the LED portion cannot accurately notify a person to be photographed of a photographing timing. Further, generally, in self-timer photographing, a camera is distant from a subject to be photographed by several meters or more, so that a photographing timing cannot possibly be communicated by sound in a noisy place, etc.

Japanese Patent Application KOKAI (Unexamined) Publication No. 1995-333710 discloses a technology by which an electronic still camera comprises photographing section for photographing an image optically, display section provided movably so that its display screen may be directed toward a photographer, and timer section for measuring elapsed time when a self-timer is operating, in such a configuration that display of an image photographed by the photographing section on the display section is stopped when the self-timer is operating to display on the display section elapsed time measured by the timer section as an image visually recognizable by a person to be photographed, so that even when the person to be photographed is present in a noisy place or far away from an installation location of the electronic still camera, he can recognize a photographing timing easily.

In the case of an electronic still camera, whose main function is photographing, by arranging a camera section and a display section independently of each other, the display section can be made movable relatively easily in configuration. However, in the case of a cellular phone set provided with a photographing function, whose main function is a portable telephone function, it is impractical to make movable a positional relationship between a photographing lens provided as an accessory function on a rear surface of the body of the cellular phone set and a display section provided on its front surface for keyboard operations because a mechanism required for this purpose becomes complicated or the cellular phone set becomes large in size and inconvenient for portability.

SUMMARY OF THE INVENTION

In view of the above circumstances, the present invention has been developed and, it is an object of the present invention to provide a cellular phone set that has a self-timer photographing function and permits a person to be photographed to recognize a photographing timing easily.

In order to achieve the above object, according to a first aspect of the present invention, there is provided a cellular phone set having a self-timer photographing function with countdown indication, comprising countdown indication means having a function to display information which notifies a photographing timing in self-timer photographing on a sub-display section mounted on a rear surface of a phone body.

According to a second aspect of the present invention, there is provided the cellular phone set having the self-timer photographing function with countdown indication of the above first aspect, wherein the function to display the information which notifies a photographing timing is constituted of means for displaying remaining seconds until photographing on the sub-display section.

According to a third aspect of the present invention, there is provided the cellular phone set having the self-timer photographing function with countdown indication of the above first aspect, wherein the function to display the information which notifies a photographing timing is constituted of means for stepwise altering a lighting intensity of backlight of the sub-display section as time for photographing draws nearer.

According to a fourth aspect of the present invention, there is provided the cellular phone set having the self-timer photographing function with countdown indication of the above first aspect, wherein the function to display the information which notifies a photographing timing is constituted of means for stepwise altering a display color of the sub-display section by using different colors as time for photographing draws nearer.

According to a fifth aspect of the present invention, there is provided the cellular phone set having the self-timer photographing function with countdown indication of any one of the above first to fourth aspects, further comprising an LED which is mounted on a rear surface of the phone body and which start blinking simultaneously with start of the self-timer photographing, the LED speeding up blinking when display of the information which notifies a photographing timing is started.

According to a sixth aspect of the present invention, there is provided the cellular phone set having a self-timer photographing function with countdown indication of any one of the above first to fifth aspects, wherein an image of a person who is being photographed by a camera is displayed on the sub-display section and the information which notifies a photographing timing in the self-timer photographing is displayed as superimposed on the image.

According to a seventh aspect of the present invention, there is provided the cellular phone set a having self-timer photographing function with countdown indication of any one of the above first to sixth aspects, wherein a form of the function to display the information which notifies a photographing timing can appropriately be set by a user.

As be clear from the various aspects of the present invention, in a cellular phone set according to the present invention, a sub-display section mounted on its rear surface is provided with a function to display information that notifies a photographing timing in self-timer photographing, so that a person to be photographed can know a photographing timing specifically to provide self-timer photographing having less failures.

Further, in a case where display by means of blinking of an LED and that of information which notifies a photographing timing by using the sub-display section are combined, it is possible to reduce time for displaying the information which notifies a photographing timing by using the sub-display section, so that an image of a person to be photographed can be confirmed using the sub-display section nearly until a moment immediately before the photographing timing.

Furthermore, by displaying on the sub-display section an image of a person who is being photographed by a camera and superimposing on it information that notifies a photographing timing in self-timer photographing, it is possible to confirm the image of the person to be photographed on the sub-display section until photographing ends, thereby providing self-timer photographing having lesser failures.

The above and many other objects, features and advantages of the present invention will become manifest to those skilled in the art upon making reference to the following detailed description and accompanying drawings in which a preferred embodiment incorporating the principle of the present invention is shown by way of illustrative examples.

DESCRIPTION OF THE PREFERRED EMBODIMENTS

The following will describe preferred embodiments of the. present invention with reference to accompanying drawings.

Figure 1:
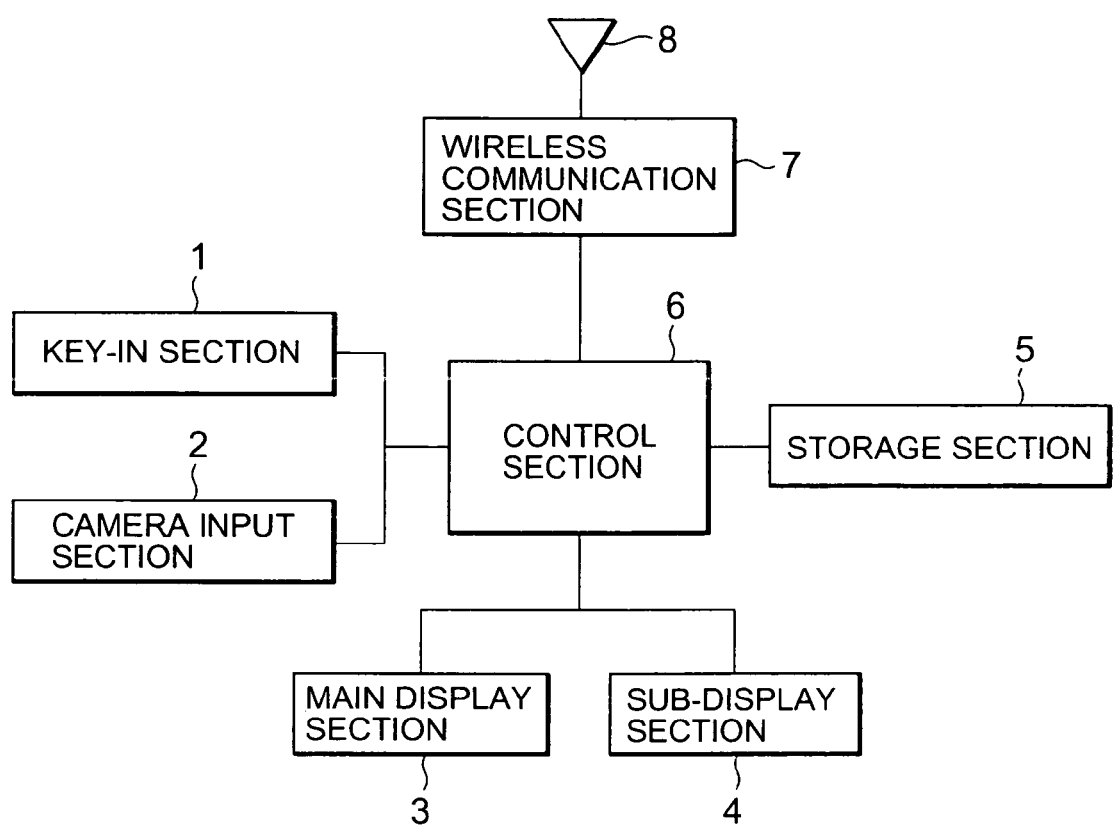
FIG. 1 is a block diagram for showing an outlined configuration of one embodiment related to a cellular phone set having a self-timer photographing function of the present invention.

FIG. 1 is a block diagram for showing an outlined configuration of one embodiment related to a cellular phone set having a self-timer photographing function of the present invention, which cellular phone set comprises: a key-in section 1 for performing cellular phone set operations including photographing, a function set, etc.; a camera input section 2 for taking in images upon photographing; a main display section 3 for displaying images taken in from the camera input section 2 and character strings, etc.; a sub-display section 4 for providing countdown indication and displaying character strings etc.; a storage section 5 for storing images taken in from the camera input section 2 or function setting values and holding numeric data of countdown indication; a control section 6 for detecting entry through the key input section 1 to control countdown indication and for controlling take-in of images from the camera input section 2 and their display on the main display section 3 and saving in the storage section 5 as well as data transmission/reception during communication at a wireless communication section 7; the wireless communication section 7 for transmitting radio waves to and receiving them from a base station; and an antenna 8.

Figure 2:
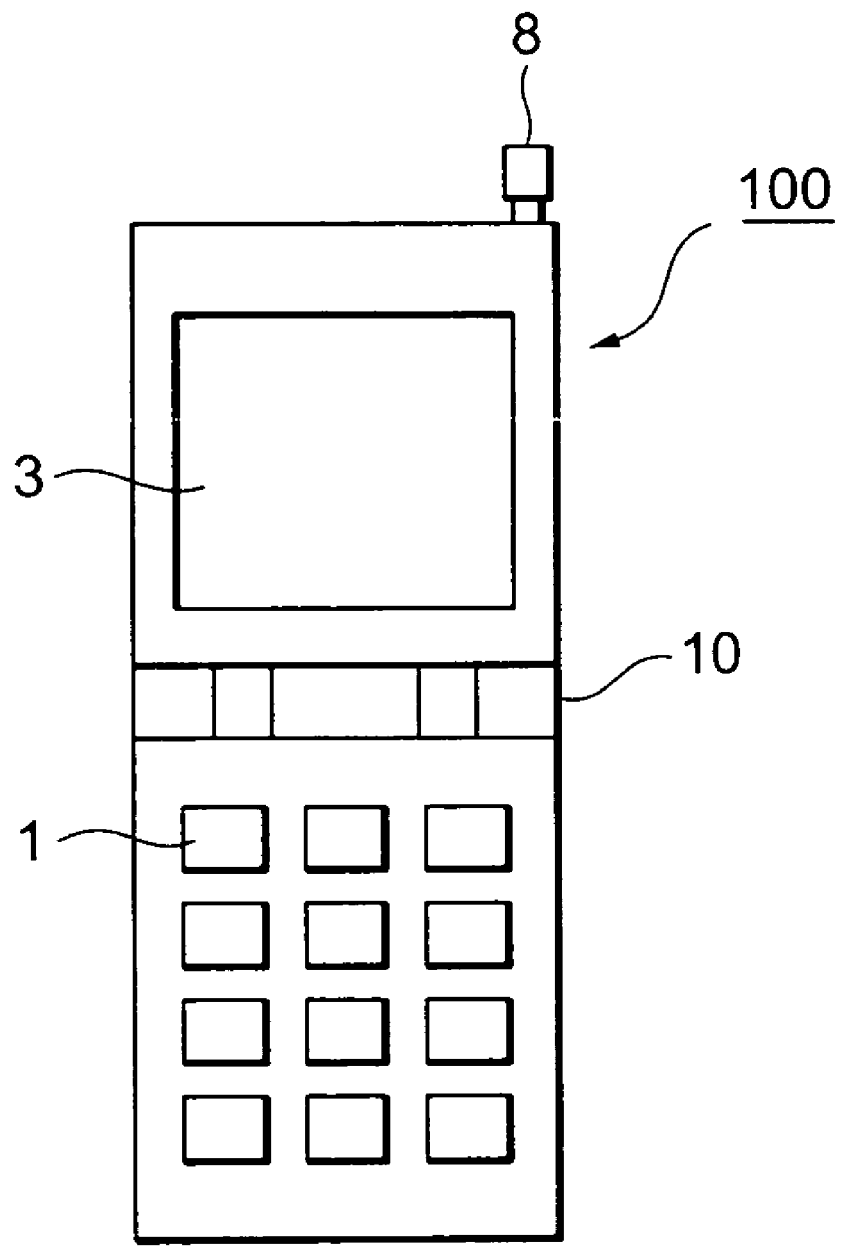
FIG. 2 is a plan view for showing appearances of the one embodiment related to a cellular phone set having a self-timer photographing function of the present invention.
Figure 3:
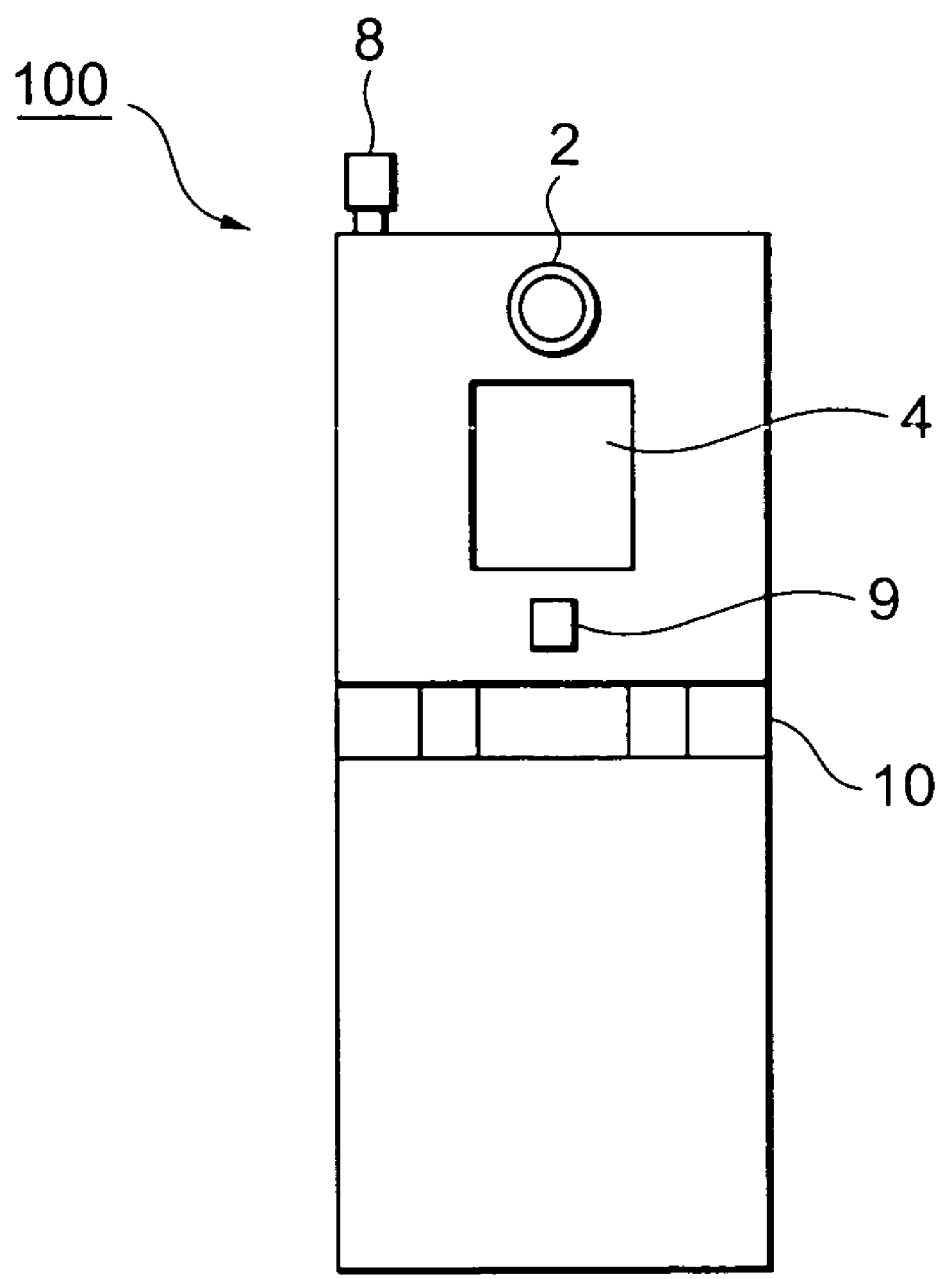
FIG. 3 is a rear view for showing the appearances of the one embodiment related to the cellular phone set having a self-timer photographing function of the present invention.

FIGS. 2 and 3 are respectively a plan view and a rear view for showing appearances of a cellular phone set having a self-timer photographing function related to an embodiment of the present invention, in which a flip phone having a hinge portion 10 is shown. On a front surface of a phone body 100, the key-in section 1 for performing various input operations and the main display section 3 are arranged and, on its rear surface, the camera input section (photographing lens) 2, the sub-display section 4, and an LED portion 9 are arranged.

Figure 4:
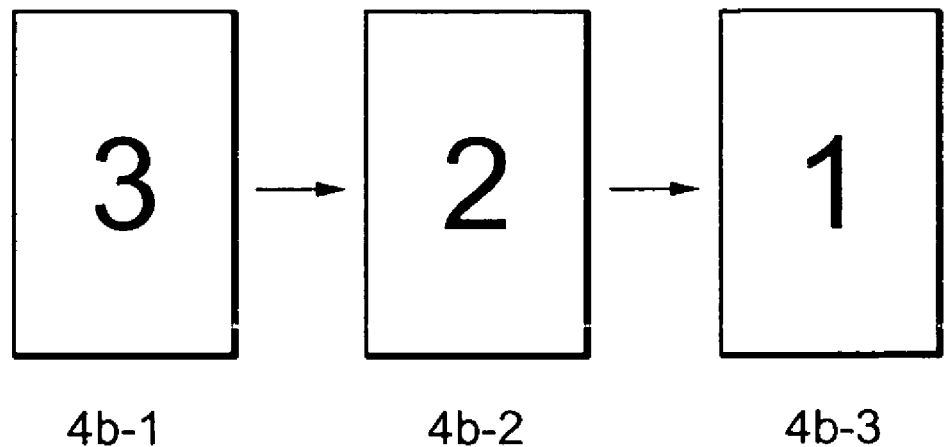
FIG. 4 is a diagram for showing one example in a case where remaining seconds until photographing is displayed in figures on a sub-display section for the purpose of countdown indication in self-timer photographing.
Figure 5:
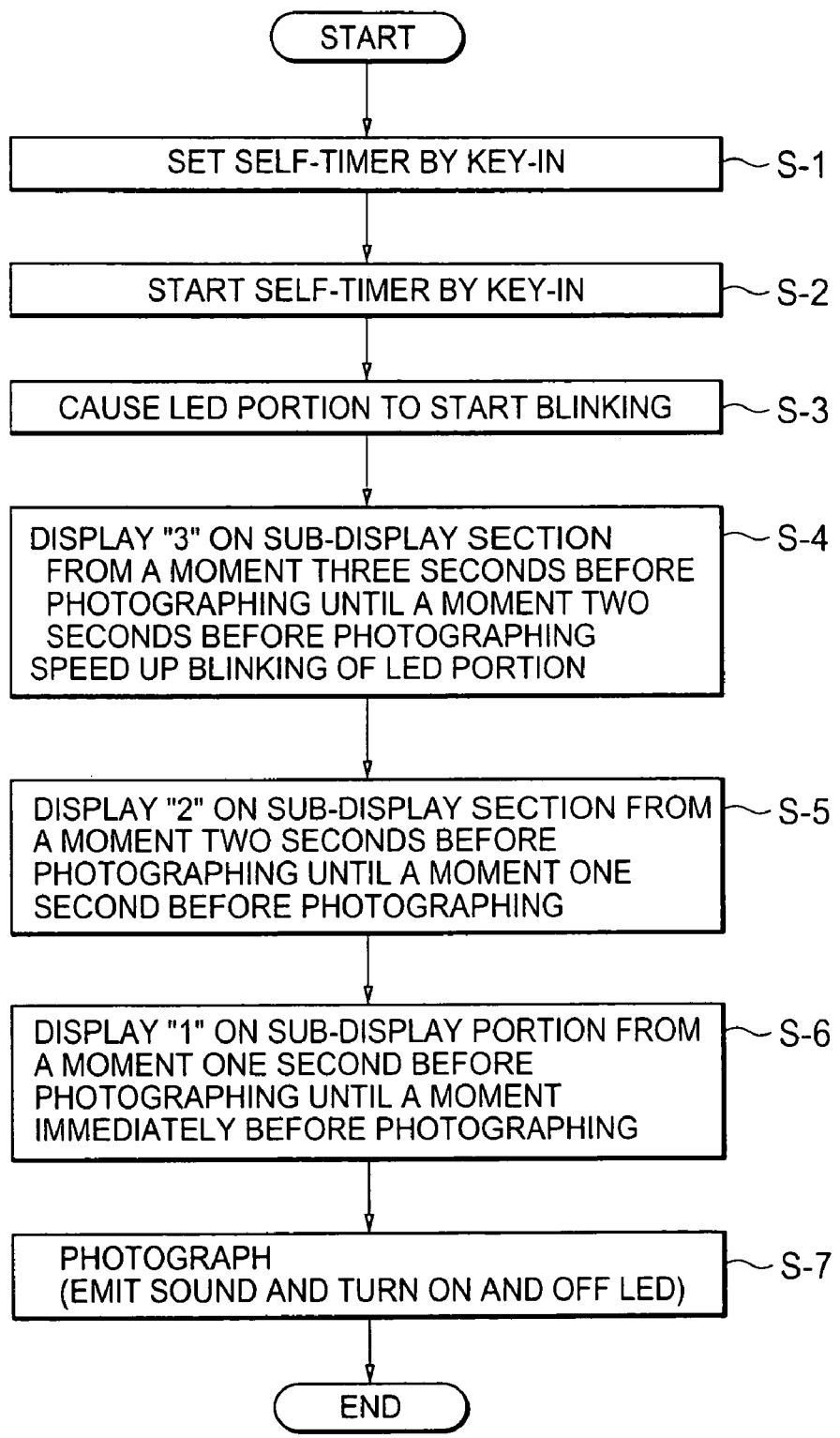
FIG. 5 is a flowchart showing an operation procedure after a self-timer is set and a camera function is activated in the cellular phone set having the self-timer photographing function of the present invention.

FIG. 4 shows one example where a countdown value is shown in figures on the sub-display section 4 during self-timer photographing, and FIG. 5 shows a flowchart of a operation procedure of from a moment when a camera function is activated, a self-timer is set and a key is then pressed to exert a self-timer function involving countdown indication to a moment when photographing starts.

The following will describe operations of a cellular phone set related to the present invention with reference to FIGS. 1–5.

First, by operating keys at key-in section 1, the self-timer is set (operations of step S-1 in FIG. 5). The process confirms contents displayed on the main display section 3 and completes setting. It is to be noted that those settings are saved in the storage section 5 by the control section 6.

Subsequently, by operating the keys further, self-timer photographing is started (operations of step S-2 in FIG. 5). In this case, to notify start of self-timer photographing, the LED portion 9 starts blinking under the control of the control section 6 (operations of step S-3 in FIG. 5).

At a moment that is three seconds before the start of photographing, the LED portion 9 speeds up blinking under the control of the control section 6 to notify a person to be photographed that photographing starts soon (operations of steps S-4 through S-6 in FIG. 5).

In photographing operations indicated by step S-7 of FIG. 5, the control section 6 causes photographing sound to be emitted and an LED of the LED portion 9 to be turned on, thereby notifying the photographed person that he has been photographed.

An image taken in from the camera input section 2 is saved in the storage section 5 by the control section 6. After photographing is finished, the LED of the LED portion 9 is turned off and display on the sub-display section 4 is erased. By visually recognizing these two events, the photographed person can clearly know that photographing has been finished.

According to a first embodiment of countdown indication in a cellular phone set of the present invention, in addition to blinking of the LED of the LED portion 9, countdown indication is provided by the sub-display section 4 starting from three seconds before, thereby enabling notifying the person in what number of seconds he is to be photographed specifically. By countdown indication, the control section 6 causes countdown numeric data obtained from the storage section 5 to be displayed on the sub-display section 4 as figures having such a size that the person to be photographed can recognize visually. On the sub-display section 4, numerals shown in FIGS. 4-1, 4-2, and 4-3 are displayed in this order as shown in FIG. 4.

Although in the first embodiment countdown indication has started three seconds before photographing, it may start four seconds or more before or two second or less before. A countdown may be set to an appropriate number of seconds for each of devices to be mounted or variable countdown indication set by a user may be provided.

As a second embodiment of countdown indication in a cellular phone set of the present invention, a method can be employed, for example, for stepwise turning up backlight of a sub-display section 4 as time for photographing draws nearer.

Further, as a third embodiment of countdown indication in a cellular phone set of the present invention, a sub-display section 4 can provide display by using its different display colors (e.g., read, yellow, and blue).

It is also possible for a user to appropriately employ any one of the countdown indication forms of the first through third embodiments or combine them.

An image of a photographed person, which is displayed on the sub-display section 4 in self-timer photographing, is not displayed during countdown indication if this is displayed in figures or by using different colors. However, in the case of the method for turning up backlight stepwise, it is possible to continue displaying the image of the photographed person on the sub-display section 4 until photographing ends, thereby confirming the image.

Furthermore, according to the third embodiment of countdown indication in a cellular phone set of the present invention, during count-down indication, even if provided in figures or by colors, by superimposing one on the other in display an image of a person to be photographed and a countdown numeral which are displayed on the sub-display section 4 or by stepwise displaying by colors only a periphery of the sub-display section 4 in accordance with remaining time until before start of photographing, it is possible to continue displaying the image of the person to be photographed on the sub-display section 4 until photographing ends, thereby confirming the image.

Although the above embodiments related to a cellular phone set of the present invention have been described with reference to the case of a flip phone having a hinge portion, the present invention is applicable also to a cellular phone set constituted of a single frame as far as a sub-display section is mounted on its rear surface.

What is claimed is:

1. A cellular phone set having a self-timer photographing function with countdown indication, comprising countdown indication means having a function to display information which notifies a photographing timing in self-timer photographing on a sub-display section mounted on a rear surface of a phone body,
   wherein an image of a person who is being photographed by a camera is displayed on the sub-display section and the information which notifies a photographing timing in the self-timer photographing is displayed as superimposed on the image.

2. The cellular phone set having the self-timer photographing function with countdown indication according to claim 1, wherein a form of the function to display the information which notifies a photographing timing can appropriately be set by a user.

3. A cellular phone set having a self-timer photographing function with countdown indication, comprising countdown indication means having a function to display information which notifies a photographing timing in self-timer photographing on a sub-display section mounted on a rear surface of a phone body,
   wherein the function to display the information which notifies a photographing timing is constituted of means for displaying remaining seconds until photographing on the sub-display section, and
   wherein an image of a person who is being photographed by a camera is displayed on the sub-display section and the information which notifies a photographing timing in the self-timer photographing is displayed as superimposed on the image.

4. The cellular phone set having the self-timer photographing function with countdown indication according to claim 3, further comprising an LED which is mounted on a rear surface of the phone body and which start blinking simultaneously with start of the self-timer photographing, the LED speeding up blinking when display of the information which notifies a photographing timing is started.

5. A cellular phone set having a self-timer photographing function with countdown indication, comprising countdown indication means having a function to display information which notifies a photographing timing in self-timer photographing on a sub-display section mounted on a rear surface of a phone body,
   wherein the function to display the information which notifies a photographing timing is constituted of means for stepwise altering a lighting intensity of backlight of the sub-display section as time for photographing draws nearer, and
   wherein an image of a person who is being photographed by a camera is displayed on the sub-display section and the information which notifies a photographing timing in the self-timer photographing is displayed as superimposed on the image.

6. The cellular phone set having the self-timer photographing function with countdown indication according to claim 5, further comprising an LED which is mounted on a rear surface of the phone body and which start blinking simultaneously with start of the self-timer photographing, the LED speeding up blinking when display of the information which notifies a photographing timing is started.

7. A cellular phone set having a self-timer photographing function with countdown indication, comprising countdown indication means having a function to display information which notifies a photographing timing in self-timer photographing on a sub-display section mounted on a rear surface of a phone body,
   wherein the function to display the information which notifies a photographing timing is constituted of means for stepwise altering a display color of the sub-display section by using different colors as time for photographing draws nearer,
   wherein an image of a person who is being photographed by a camera is displayed on the sub-display section and the information which notifies a photographing timing in the self-timer photographing is displayed as superimposed on the image.

8. The cellular phone set having the self-timer photographing function with countdown indication according to claim 7, further comprising an LED which is mounted on a rear surface of the phone body and which start blinking simultaneously with start of the self-timer photographing, the LED speeding up blinking when display of the information which notifies a photographing timing is started.

9. A cellular phone set having a self-timer photographing function with countdown indication, comprising:
   countdown indication means having a function to display information which notifies a photographing timing in self-timer photographing on a sub-display section mounted on a rear surface of a phone body; and
   an LED which is mounted on said rear surface of the phone body and which start blinking simultaneously with start of the self-timer photographing, the LED speeding up blinking when display of the information which notifies a photographing timing is started,
   wherein an image of a person who is being photographed by a camera is displayed on the sub-display section and the information which notifies a photographing timing in the self-timer photographing is displayed as superimposed on the image.

* * * * *